United States Patent
Adamson et al.

(12) 
(10) Patent No.: US 6,378,955 B1
(45) Date of Patent: Apr. 30, 2002

(54) AXLE COVER WITH A FACILITY FOR QUICK ASSEMBLY

(76) Inventors: Gary E. Adamson, 53395 Pleasant Ridge Dr., Bristol, IN (US) 46507; John R. Wright, 22532 Winchester Dr., Elkhart, IN (US) 46514; Long-Chuan Hsu, No. 39, Sha Luen, Chung Sha Vill., An Din Hsiang; Lung-Hung Hsu, No. 46, Sha Luen, Chung Sha Vill., An Din Hsiang, both of Tainan Hsien (TW)

( * ) Notice: Subject to any disclaimer, the term of this patent is extended or adjusted under 35 U.S.C. 154(b) by 0 days.

(21) Appl. No.: 09/609,709

(22) Filed: Jul. 3, 2000

(51) Int. Cl.$^7$ ................................................. B60B 7/14
(52) U.S. Cl. ............................... 301/108.4; 301/37.31; 301/37.371
(58) Field of Search .......................... 301/37.31, 37.37, 301/108.1, 108.2, 108.3, 108.4, 37.371

(56) References Cited

U.S. PATENT DOCUMENTS

| | | | | |
|---|---|---|---|---|
| 681,667 A | * | 8/1901 | Call .......................... | 301/37.31 |
| 840,172 A | * | 1/1907 | Summers ................. | 301/37.37 |
| 2,050,107 A | * | 8/1936 | Martin ..................... | 301/37.31 |
| 3,876,257 A | * | 4/1975 | Buerger ................... | 301/37.42 |
| 4,040,672 A | * | 8/1977 | Imahashi ................. | 301/108.1 |
| 4,470,638 A | * | 9/1984 | Bartylla ................... | 301/37.34 |
| 4,932,724 A | * | 6/1990 | Wright .................. | 301/37.371 |
| 5,876,099 A | * | 3/1999 | Irgens-Moller et al. .. | 301/108.4 |
| 6,152,537 A | * | 11/2000 | Wright et al. ............ | 301/37.31 |

* cited by examiner

*Primary Examiner*—Russell D. Stormer
*Assistant Examiner*—Frantz F. Jules
(74) *Attorney, Agent, or Firm*—Rosenberg, Klein & Lee

(57) ABSTRACT

An axle cover for covering a wheel axle of an automobile comprises a lock frame, seating elements, and a cover. The lock frame has at least one through hole in which the seating element is inserted and extends therefrom. The cover has at least one settling hole whose position is adapted to correspond to the through hole of the lock frame. After securing the lock frame to the wheel axle, the cover can be easily sleeved on to the wheel axle and have it blocked by settling blocks on the seating element. The seating element is further designed to be a flexible structure so that the cover can be easily sleeved on and easily moved off the wheel axle just by pushing the flexibly mounted settling blocks inside the lock frame.

2 Claims, 8 Drawing Sheets

AXLE COVER WITH A FACILITY FOR QUICK ASSEMBLY

FIELD OF THE INVENTION

This invention is related to the field of automobile decoration elements, and more particularly to a wheel axle cover that can be quickly assembled.

BACKGROUND OF THE INVENTION

Despite the type, a wheel is mostly iron-material. However, iron easily rusts which causes the wheel to be etched. In order to overcome such issues, an alloy wheel cover is coupled with a wheel, with an axle cover applied to the rear wheels to protect and decorate the wheels. Most wheel covers don't have their own screws for attachment, but co-use those of the wheels'. Though this design saves the requirement for screws, it leads to more work to loosen/tighten all the screws when it comes to remove/seat the wheel covers. Moreover, most automobiles have speed meters on their rear wheel axles which may require frequent maintenance and adjustment, and every time it is required, all the screws of the rear wheel must be removed just to expose the wheel axle, then they have to all be put back afterward. However, it's not efficient if one just needs to expose the wheel axle to take the whole wheel apart (because the wheel cover shares the same screws as the wheel, and when you loose one, you also loose the other).

In FIG. 8, a prior design had an aluminum coated wheel to improve its surface. Though this design solved some issues, it still led to the wheel axle being exposed to the air. Thus, the prior art still has something to be desired.

SUMMARY OF THE INVENTION

The object of this invention is to provide a wheel axle cover which can be easily and quickly removed and seated without taking off the whole wheel, and even more without taking the wheel cover apart.

An axle cover comprises a lock frame, seating elements, and a cover. The lock frame has at least one through hole. Each seating element has at least one settling block which is flexible and inserted in the through hole and sticks out therefrom. The cover has at least one settling hole whose position is adapted to the through hole of the lock frame so as to have the settling hole aligned to said through hole when the cover is assembled on to the lock frame. The cover can be attached with the lock frame by having the settling block stick in the through hole and the settling hole. After screwing the lock frame on the wheel axle, one can easily seat the cover on the wheel axle and have it blocked and easily removed just by pushing the flexible settling block back inside.

BRIEF DESCRIPTION OF THE DRAWINGS

These and other features and advantages of the present invention will become more apparent from the following detailed description of an exemplary embodiment thereof as illustrated in the accompanying drawings, in which.

DETAILED DESCRIPTION OF THE INVENTION

Figure 1:
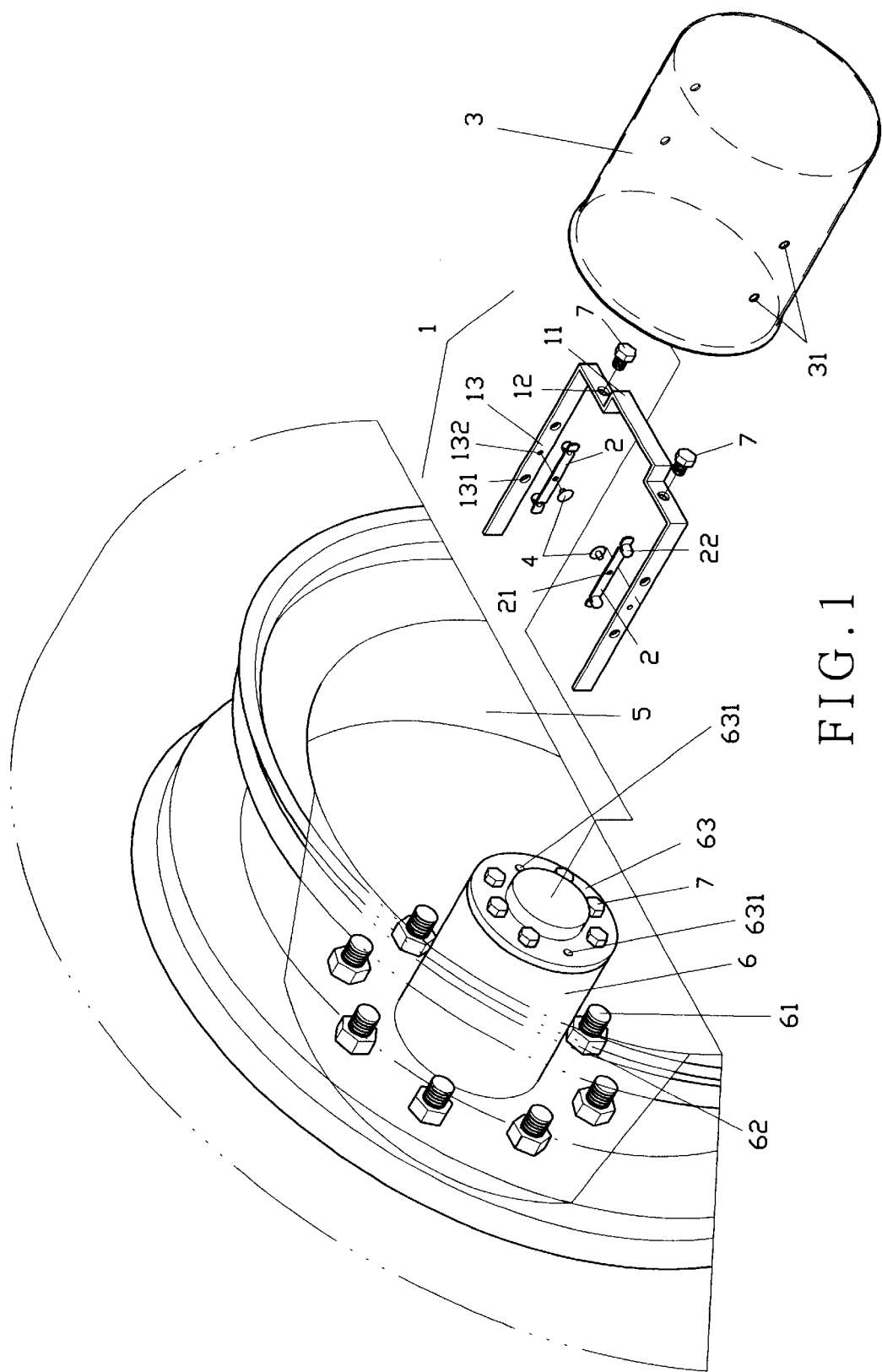
FIG. 1 is a perspective view of a first embodiment of this invention.

Please refer to FIG. 1. A lock frame 1, seating elements 2 and a cover 3 are main elements of the first embodiment and are combined with a wheel axle of a rear wheel 5. The wheel axle 6 is fixed on the wheel 5 by screws 61 and nuts 62. A speed meter, not shown in FIG. 1, can be set inside the wheel axle 6. The wheel axle 6 further comprises several axle holes 631 in an axle top cover 63 which is seated on the wheel axle 6 by some screws 7.

The lock frame 1 is designed to fit the shape of the wheel axle 6 so as to have an inverted U-shaped structure 11 at it's top portion. At sides of said inverted U-shaped structure 11, there are two setting openings 12. In two legs 13 of the lock frame 1, there are through holes 131 and combining holes 132.

Each of the seating elements 2 has an opening 21 in the middle and settling blocks 22 on each end. The seating elements 2 have flexibility so that the settling blocks 22 can be pushed inside the lock frame 1.

The cover 3 is adapted to the wheel axle and has several settling holes 31 whose position are adapted to be aligned with the through holes 131 when the cover 3 is sleeved on to the lock frame 1.

Figure 2:
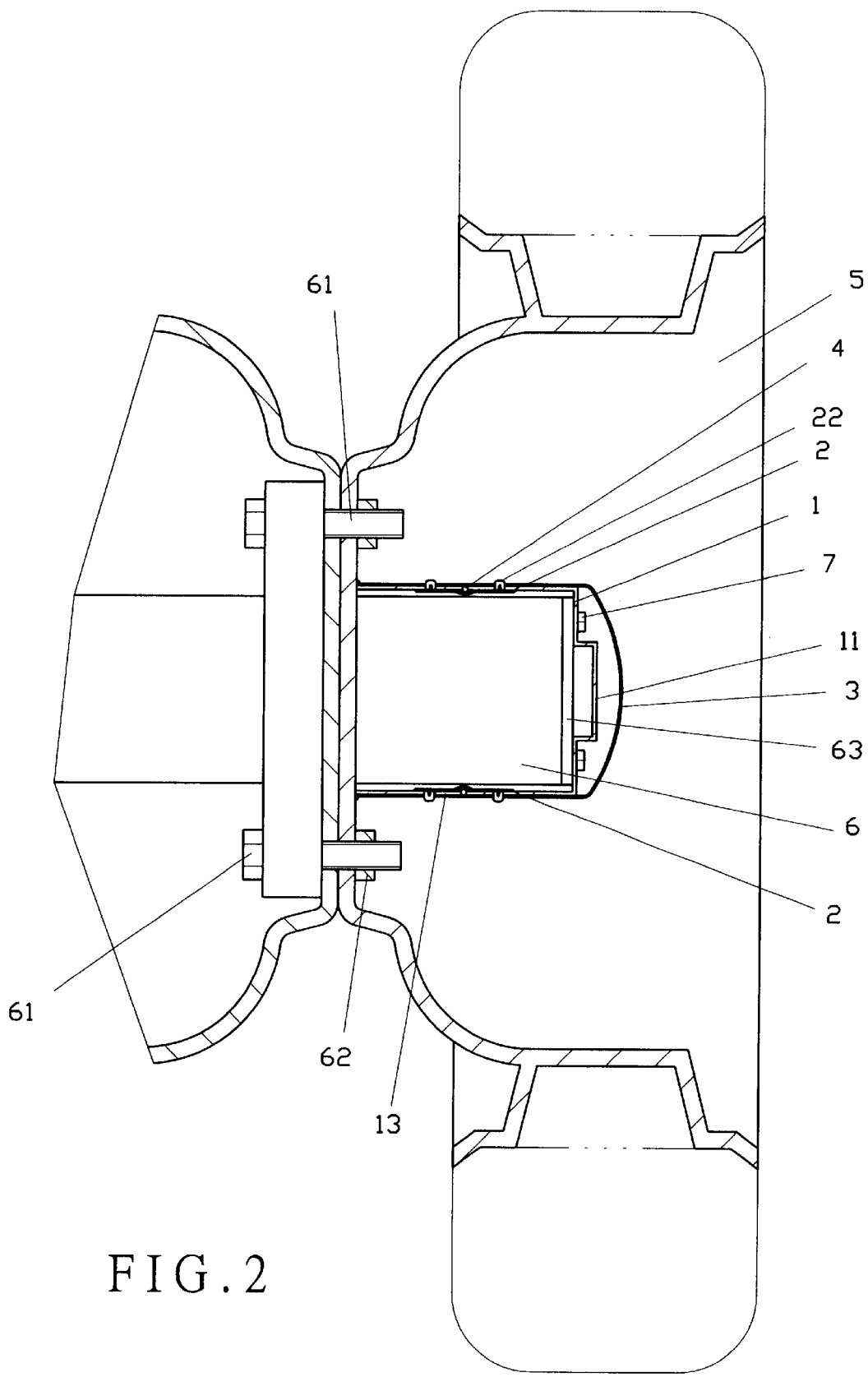
FIG. 2 is a cross-sectional view of the first embodiment.
Figure 3:
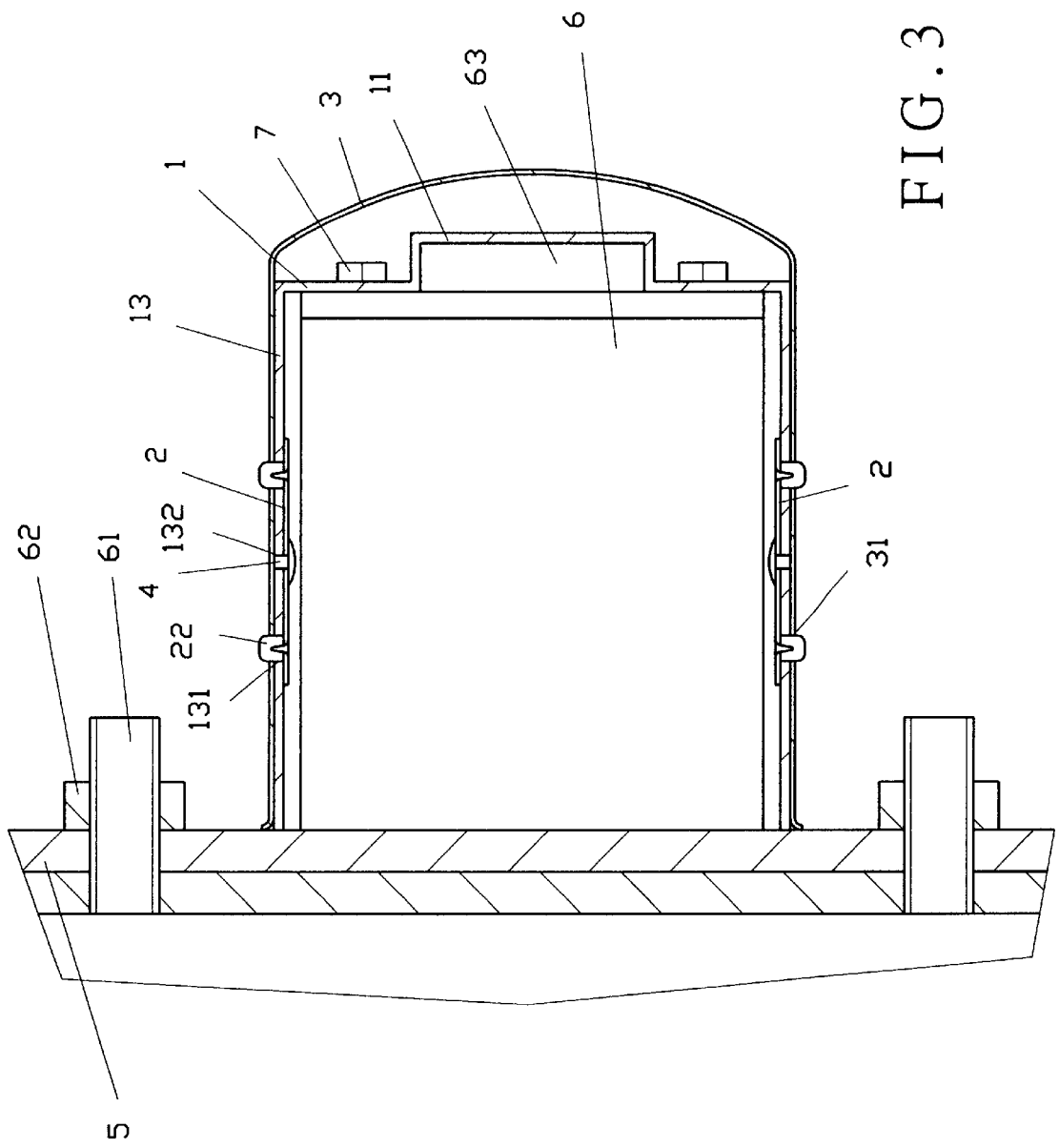
FIG. 3 is a cross-sectional view of one portion of the first embodiment.

Please refer to FIG. 2 and FIG. 3. When it comes to assembly, screws 4 connect the seating elements 2 to the lock frame 1 through the openings 21 to the combining holes 132 in the legs 13. The settling blocks 22, pass through corresponding holes 131, and extend outwardly therefrom.

After adapting the lock frame 1 to the wheel axle 6, two legs 13 are disposed on the sides of the wheel axle 6. Screws 7, passing through the setting openings 12, screw into the axle holes 631 in the axle top cover 63 so as to fix the lock frame 1 on the wheel axle 6.

Next, the cover 3 is sleeved on to the wheel axle 6. The settling blocks 22 will be first pushed inside of the lock frame 1. Once the cover 3 is moved to the right place, i.e. when the settling holes 31 align with the through holes 131, the settling blocks 22 will then be free and extend out through the settling holes 31. Therefore, the settling blocks 22 extending through the settling holes 33 will releaseably fix the cover 3 to the lock frame 1 and thereby the wheel axle 6.

To remove the cover 3, one can push the settling blocks 22 back inside and pull the cover 3 out quickly without losing any screws. So, there are no extra steps to remove the cover 3, which certainly reduces wasted time for those that maintain automobiles.

Figure 4:
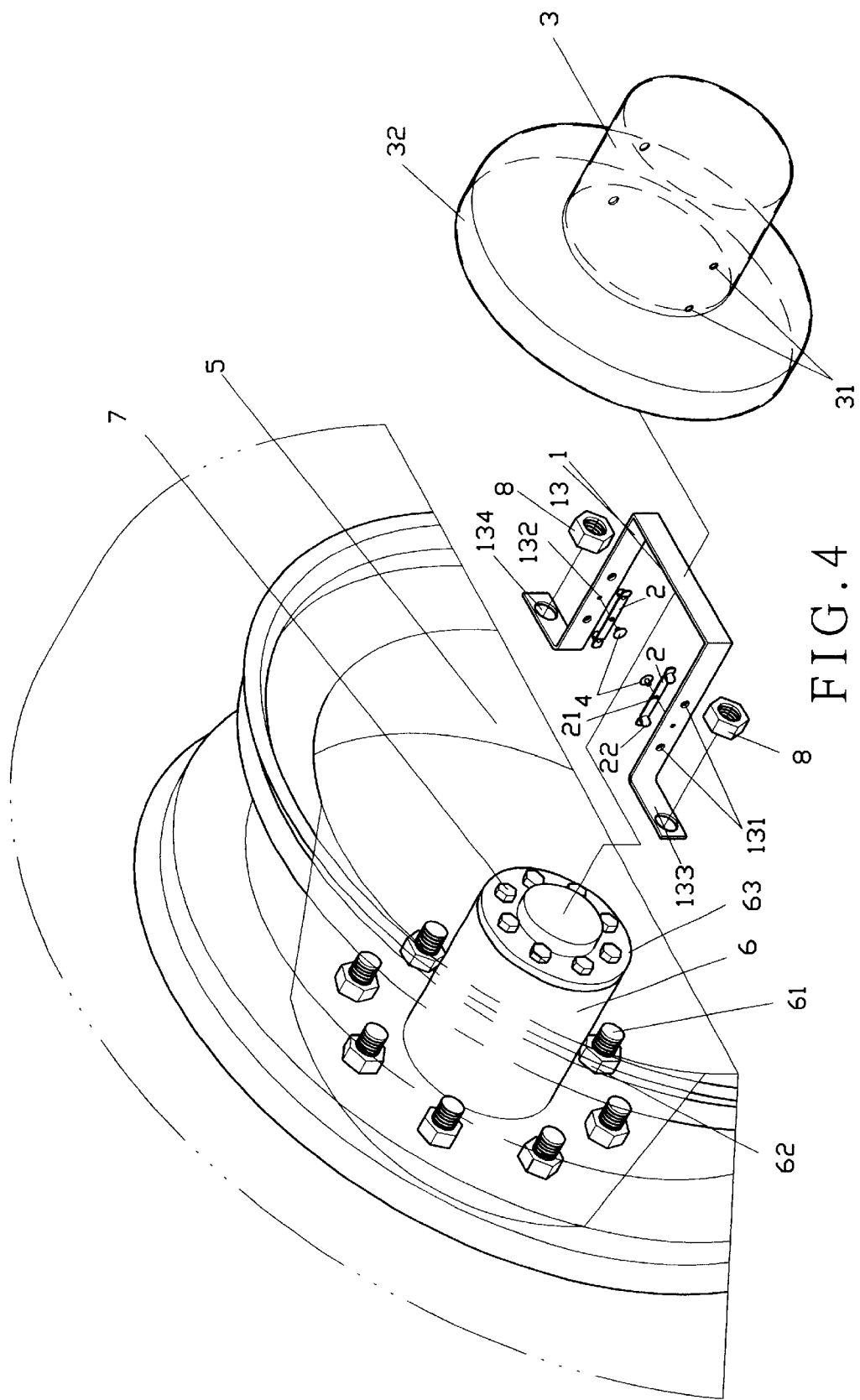
FIG. 4 is a perspective view of a second embodiment.

Please refer to FIG. 4 which shows the second embodiment of the invention. In the second embodiment, the lock frame 1 is designed to have a U-shaped contour. Plates 133 extend from the two legs 13 and have lock holes 134 formed therethrough. The cover 3 also has a flange 32.

Figure 5:
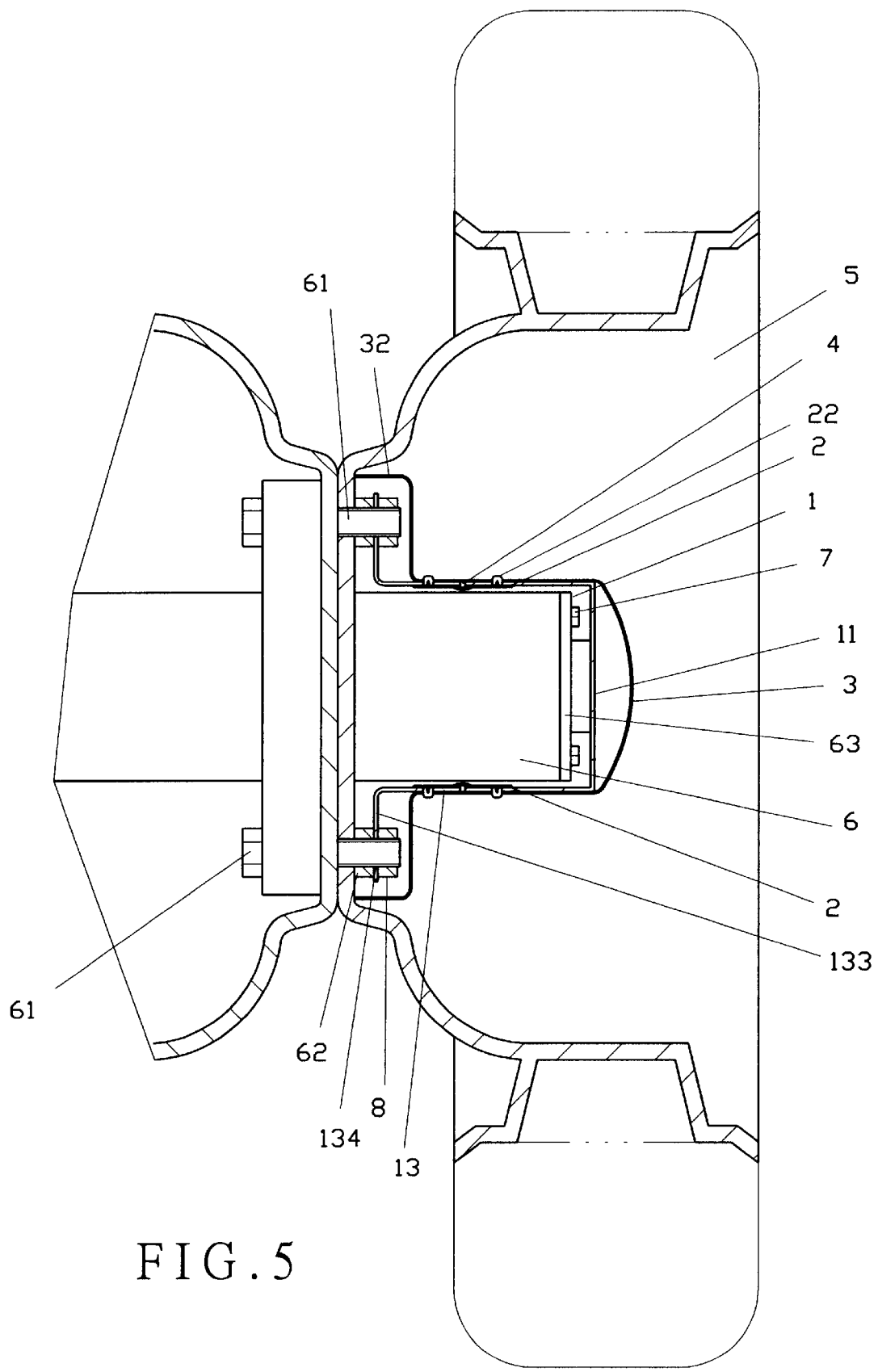
FIG. 5 is a cross-sectional view of the second embodiment.
Figure 6:
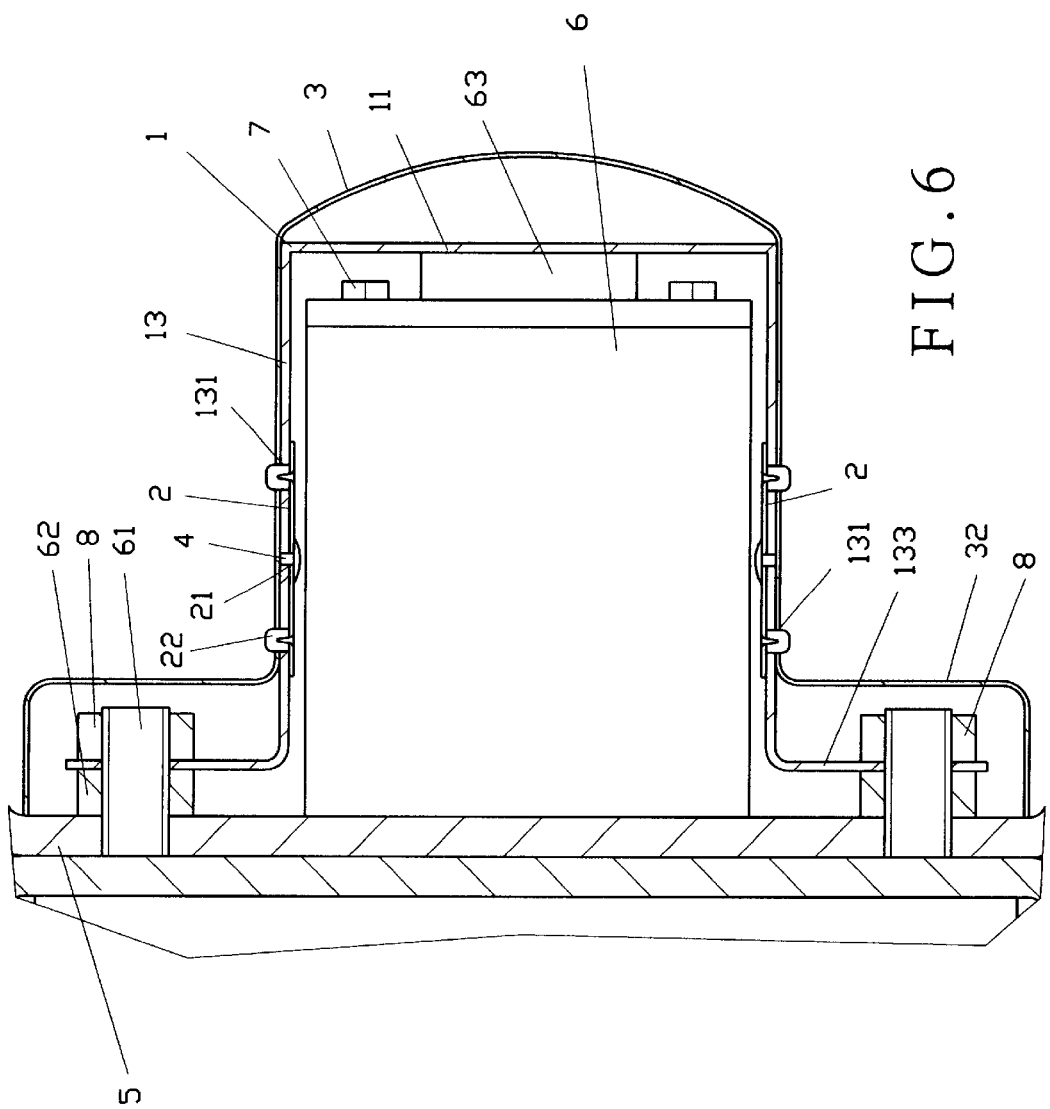
FIG. 6 is a cross-sectional view of one portion of the second embodiment.

In FIG. 5 and FIG. 6, the second embodiment utilizes the original screws 61 to secure the lock frame 1. The plates 133 are fixed to the screws 61 by nuts 8, the screws 61 passing through lock holes 134 to thereby fix the plates 133 to the wheel axle 6. The cover 3 is sequentially sleeved onto the wheel axle 6 and fixed by the seating elements 2 on the lock frame 1. The flange 32 of the cover 3 will further cover the screws 61 on the wheel 5 which will improve its outward appearance.

Figure 7:
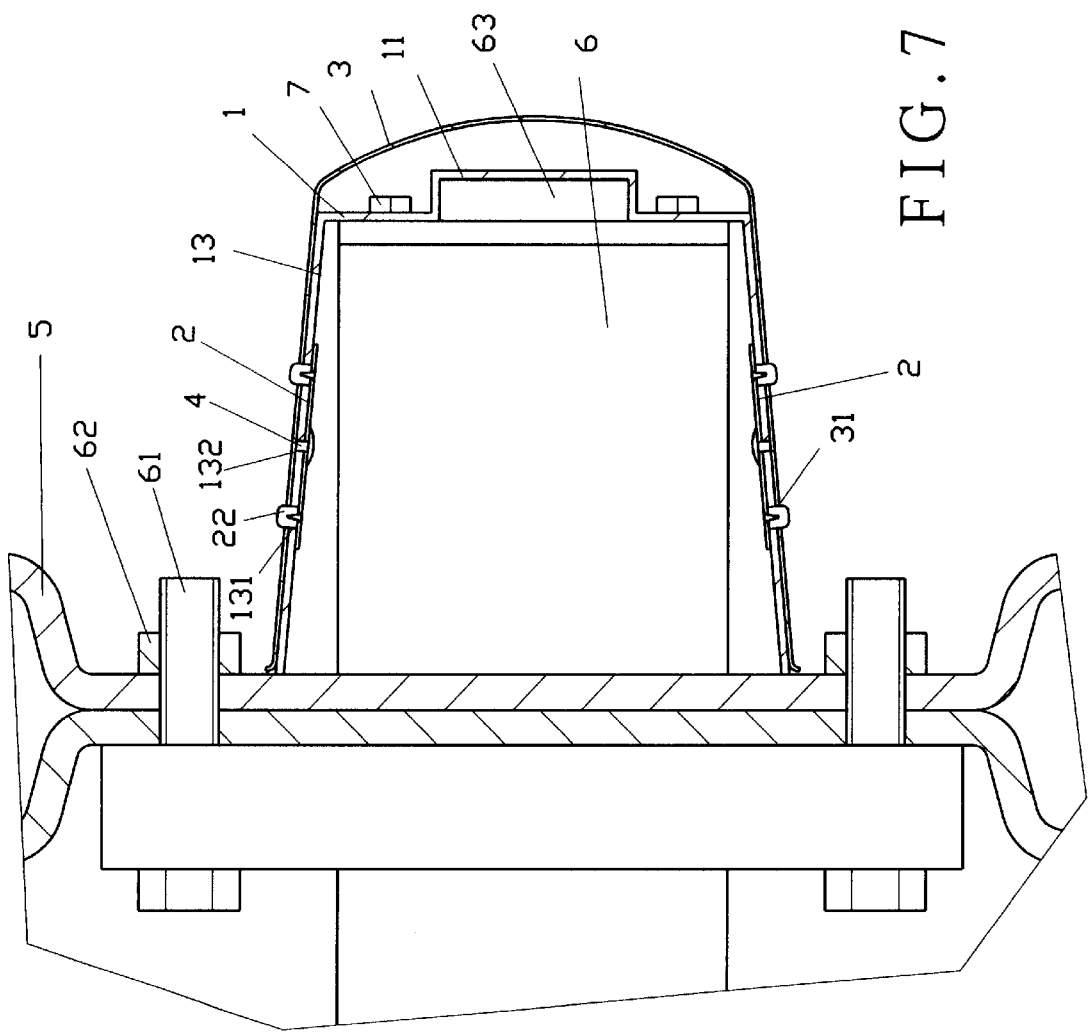
FIG. 7 is a cross sectional view of the third embodiment.
Figure 8:
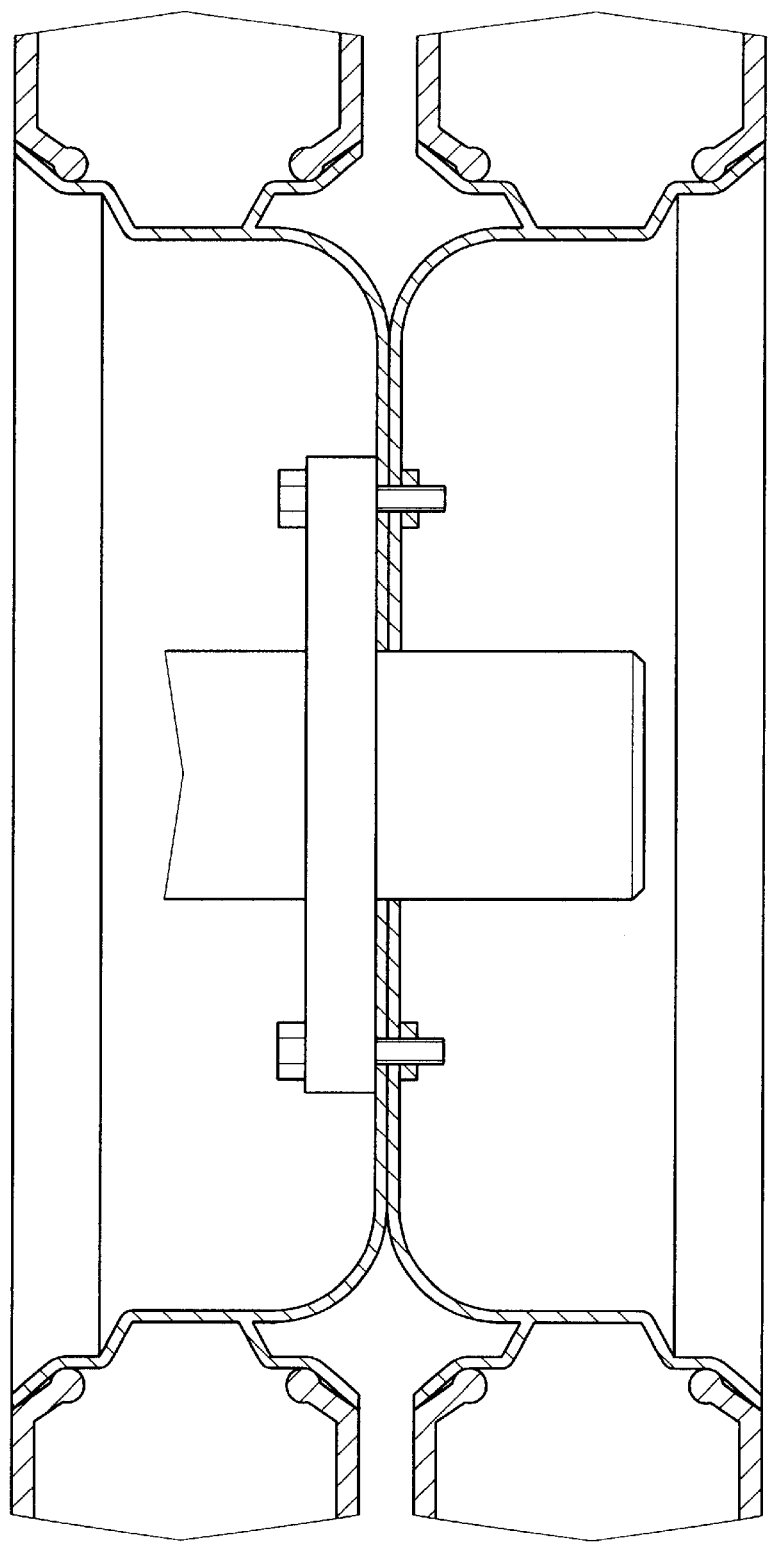
FIG. 8 is a view of a prior art structure.

Please refer to FIG. 7 which shows the third embodiment of the invention. To save storage space, the cover 3 is designed to have a cup-like contour. In this manner, each cover 3 can be staked, one into another. And the lock frame 1 will be shaped to correspond to the cover 3 by having legs 13 outwardly sloped to form a ladder-like shape. However, the third embodiment has the same assembly sequence as described above.

Further, the lock frame 1 can be designed as a cross-shape, or some other shape. In fact, the only requirement of the lock frame is to support the settling blocks 22 at the appropriate position for correspondence with the cover 3, so as to have the cover 3 quickly connect with the wheel axle 6.

It's understood that the above-described embodiments are merely illustrative of a possible specific embodiment present main principles of the invention. Other arrangements may be devised in accordance with these principles by those skilled in the art, without departing from the scope and spirit of the invention.

What is claimed is:

1. An axle cover for covering a wheel axle of a vehicle, comprising:

a lock frame mounted to the wheel axle, said lock frame having at least a pair of legs extending coaxially with the wheel axle, each of said legs having at least one through hole formed therein;

a pair of seating elements respectively mounted to said legs of said lock frame, each of said seating elements flexibly supporting at least one settling block thereon, said at least one settling block being displaceably extended through a respective through hole in a corresponding leg of said lock frame; and, a cover sleeved over the wheel axle and said lock frame, said cover having a plurality of settling holes respectively disposed in aligned relationship with said through holes for receiving a respective settling block therein;

wherein said cover is releasably secured to said lock frame by passage of said settling blocks into corresponding settling holes of said cover, and released from securement by depressing said settling blocks to displace said settling blocks from said settling holes while pulling said cover from the wheel axle.

2. The axle cover according to claim 1, wherein each of said pair of seating elements has a centrally disposed portion affixed to a respective leg of said lock frame and a pair of settling blocks respectively coupled to opposing ends of said seating element, each of said legs of said lock frame having a pair of through holes respectively receiving said pair of settling blocks of a corresponding seating element.

* * * * *